United States Patent [19]
Foutz et al.

[11] Patent Number: 5,647,425
[45] Date of Patent: Jul. 15, 1997

[54] APPARATUS AND METHOD FOR FORMING ELECTRICAL CONNECTIONS

[75] Inventors: George W. Foutz, Rocky River; Richard E. Singer, Beachwood, both of Ohio

[73] Assignee: Erico International Corporation, Solon, Ohio

[21] Appl. No.: 535,925

[22] Filed: Sep. 28, 1995

[51] Int. Cl.[6] ................................................ B23K 23/00
[52] U.S. Cl. ........................ 164/54; 228/234.3; 249/97; 249/105
[58] Field of Search .......................... 228/234.3, 256, 228/33; 164/54, 53; 249/97, 105

[56] References Cited

U.S. PATENT DOCUMENTS

| | | |
|---|---|---|
| 2,957,214 | 10/1960 | Kuharski ............... 249/97 |
| 3,004,310 | 10/1961 | Burke . |
| 3,020,610 | 2/1962 | Rejdak .................. 228/234.3 |
| 3,022,554 | 2/1962 | Burke . |
| 3,113,359 | 12/1963 | Burke . |
| 3,234,603 | 2/1966 | Leuthy et al. . |
| 3,255,498 | 6/1966 | Leuthy et al. . |
| 3,262,163 | 7/1966 | Gelfand ................. 228/234.3 |
| 5,582,228 | 12/1996 | Stidham et al. ........ 228/234.3 |

FOREIGN PATENT DOCUMENTS 582089  8/1959  Canada .................. 164/54

OTHER PUBLICATIONS

Article Cadweld® Electrical Connections, Materials and Tools, Section A, pp. A1–A8, 1989, Erico Products Inc.

*Primary Examiner*—P. Austin Bradley
*Assistant Examiner*—Jeffrey T. Knapp
*Attorney, Agent, or Firm*—Renner, Otto, Boisselle, Sklar

[57] ABSTRACT

A mold assembly and method for lap welding a conductor to a vertical bar or rod features two vertically split mold parts having a major parting surface in which are formed a crucible, tap hole, sleeving for the conductor and a weld chamber. An offset parting surface forms a sleeving passage for the vertical bar or rod, and a portion of the weld chamber. The offset parting surface is formed in an interfitting tongue and groove which assists in the assembly of the mold parts.

16 Claims, 1 Drawing Sheet

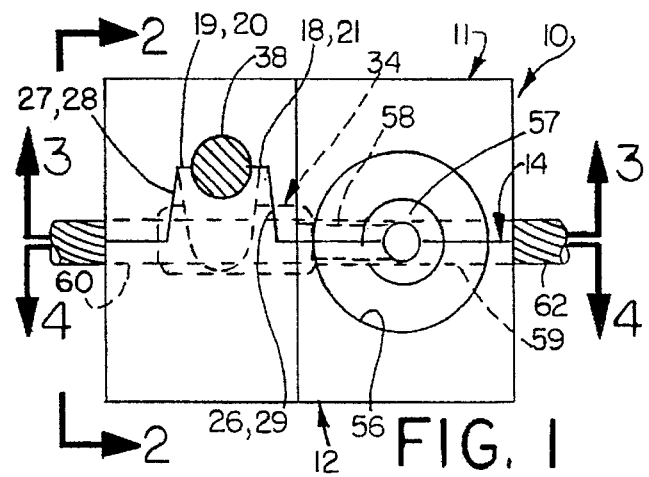
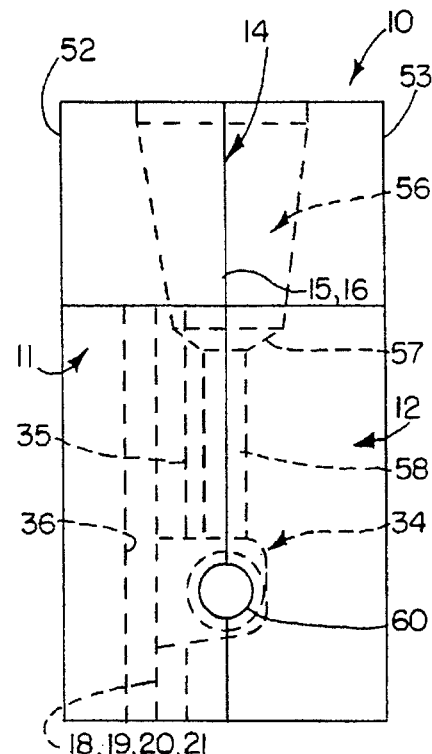
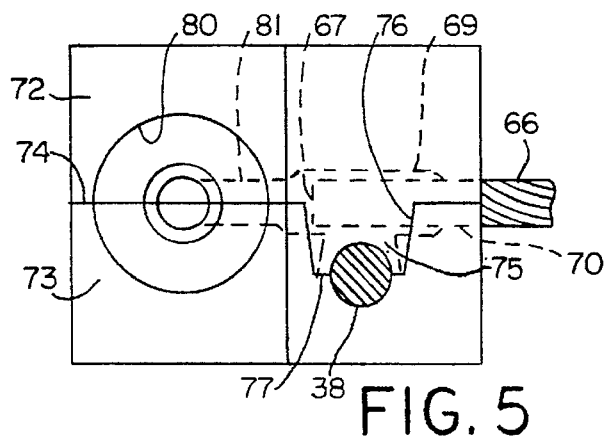
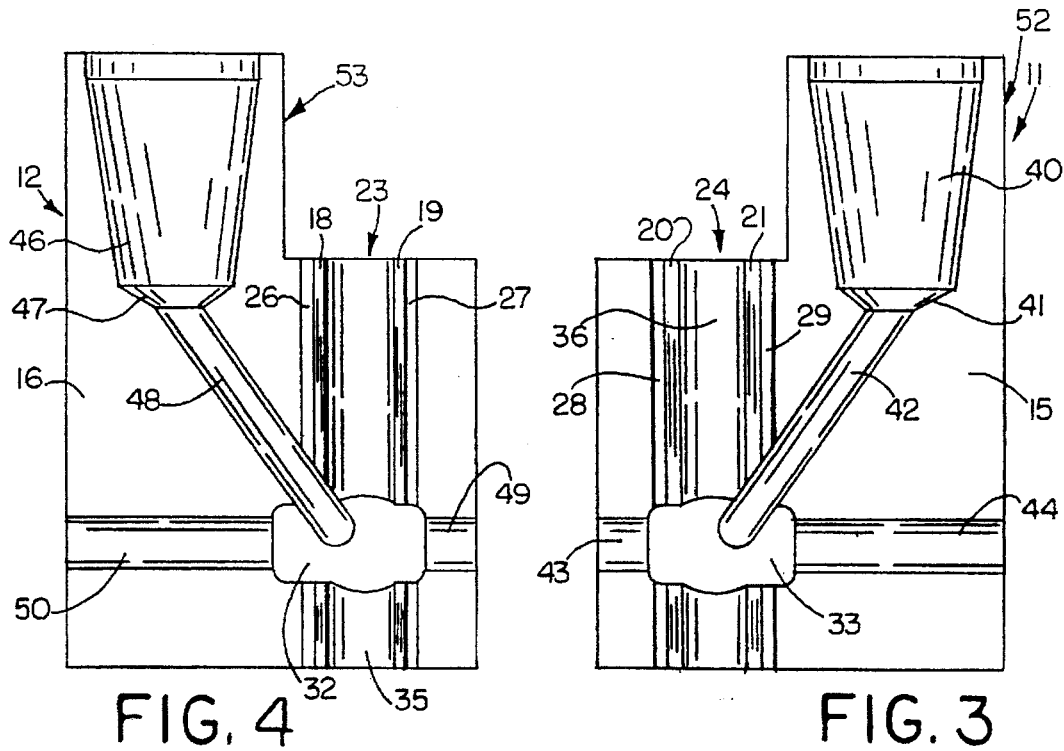

APPARATUS AND METHOD FOR FORMING ELECTRICAL CONNECTIONS

DISCLOSURE

This invention relates generally as indicated to apparatus and methods for forming electrical connections, and more particularly to exothermic reaction molds and mold assemblies for forming exothermic welds, and to methods of forming such welds.

BACKGROUND OF THE INVENTION

Exothermic welds have long been recognized as the best electrical quality connection between two parts or conductors. No mechanical connection makes a comparable low resistance, high ampacity, long lived connection.

Exothermic welds are made using graphite or ceramic mold parts which form a crucible, a weld chamber, and an interconnecting tap hole. An exothermic reaction mixture is placed in the crucible on a fusible steel disc. When the exothermic material is ignited, the reaction produces molten metal which fuses the disc. The molten metal runs down through the tap hole and welds the parts to be welded in the weld chamber. Any slag formed rises to the top and enters the tap hole last to collect in an expanded section of the tap hole called a riser chamber. The slag is removed after the weld is formed.

After the weld is cooled, the molds are opened and cleaned for reuse. A mold set is usually opened and closed by one or more toggle frames which when closed, clamp the parts together to form the complete mold assembly.

Exothermic welds are used for a variety of connections which range from full fusion connections to "tack" welds. "Tack" welds are usually smaller charges and are widely used to "tack" a conductor to a surface or another object such as a ground rod, pipe, rebar, rail, or any major surface such as a steel sheet, column or beam.

Where the weld is to be formed on the side or top of a vertical object such as a ground rod or rebar, the crucible may be horizontally offset from the weld chamber and connected to the weld chamber by a tap hole.

Heretofore, mold assemblies for such connections have required at least three or more mold parts. This is particularly true where the conductor is lapped with respect to the bar or rod. Even though the conductor may extend transversely of the rod or bar, the axes would be offset. For such cleaning purposes, it has been desirable to provide parting planes or splits along the axes of the parts being joined, and also along the tap hole and even the crucible. This required a number of offset and/or perpendicular parting planes and hence a high number of mold parts and frames in the assembly.

Since such mold parts and subassemblies are held together and opened and closed by the toggle frames, three or more parts usually requires two or more frames which project from the molds. If other parts such as a clamp are used to hold the assembly to a workpiece or part, the entire assembly becomes overly complex and requires a considerable amount of space.

The economics of exothermic welding, whether the weld be a full fusion welds or simply a "tack" weld, dictate that the apparatus be as simple as possible and reusable. If preparation or limited life parts adds to the cost, then at some point the owner will sacrifice a quality electrical connection for cost, Accordingly, it would be desirable to have a mold assembly for such welds having only two parts, greatly simplifying the assembly, but also one in which the various holes or sleeving can quickly be cleaned for reuse.

SUMMARY OF THE INVENTION

A mold assembly and method for lap welding a conductor to a rod or bar such as a ground rod or a steel reinforcing rod uses only two vertically split mold parts which include sleeving passages for the conductor as well as the rod or bar. The parts also include mating recesses forming the crucible and a tap hole extending from the bottom of the crucible to a weld chamber formed at the closest proximity of the axes of the rod or bar and the conductor. The major parting plane extends through the crucible, tap hole, and the conductor sleeving. The parting plane for the rod or bar is, however, offset from the major parting plane of the mold parts and formed in an interfitting tongue and groove on the respective mold parts which assists in alignment and clamping of the mold parts. The crucible is split along the major parting plane and horizontally offset from the tongue and groove with the tap hole extending along the major parting plane at an angle to the tongue and groove. The sleeving for the conductor extends along the major parting plane either horizontally or at an angle to the rod or bar.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

FIG. 1 is a top plan view of a two part mold assembly in accordance with the present invention;

FIG. 2 is a side elevation of the assembly as seen from the left hand side of FIG. 1, but without the parts to be welded in place;

FIG. 3 is an elevation of one mold part from the parting plane as seen from line 3—3 of FIG. 1;

FIG. 4 is a reversed elevation of the opposite mold part from the parting plane as seen from the line 4—4 of FIG. 1; and FIG. 5 is a view like FIG. 1 but of a modified embodiment of the present invention.

DETAILED DESCRIPTION OF THE PREFERRED EMBODIMENTS

Referring initially to FIG. 1, there is illustrated a two part mold assembly shown generally at 10 which is formed of right and left hand mold parts seen at 11 and 12, respectively. The mold parts are held together in a clamped condition by a suitable toggle frame (not shown) which holds the parts clamped together along a vertical parting line shown generally at 14. The vertical parting line is formed primarily by two major planar surfaces on the interior of each mold part as seen at 15 and 16 in FIGS. 3 and 4, respectively.

A deviation from the major parting plane is provided by two offset parallel surfaces seen at 18 and 19 in FIG. 4 which mate with parallel offset surfaces 20 and 21 seen in FIG. 3. The offset surfaces 18 and 19 are formed at each side of a tongue seen at 23 in FIG. 4, while the surfaces 20 and 21 are formed at each side of the mating groove 24 seen in FIG. 3. The tongue 23 includes lateral sloping sides illustrated at 26 and 27, while the groove 24 has sloping mating sides 28 and 29. These surfaces provide draft and enable the parts to seat together accurately and to separate easily.

In both the right and left hand mold parts, the tongue and groove are interrupted by chambers indicated at 32 and 33 which, when the parts are joined, forms a weld cavity seen at 34 in FIGS. 1 and 2. Between the surfaces 18 and 19 forming the offset parting surface of the tongue 23, there is provided a semi-cylindrical groove or passage 35. A similar semi-circular passage 36 is provided in the center of the groove 24. The grooves extend both above and below the chambers 32 and 33. Such mating grooves form the sleeving for a vertically extending rod shown at 38 in FIG. 1. The rod may be, for example, a vertically extending ground rod or a reinforcing bar such as used in reinforced concrete construction.

The major parting planes of the two mold parts 11 and 12 are formed with half round recesses. The mold part 11 is formed with a conical recess indicated at 40 which includes a lower tapering funnel end 41 which terminates in recess or groove 42 extending diagonally to the chamber 33 forming part of the weld chamber 34. In addition, the mold part 11 major parting plane 15 is also formed with semi-circular grooves seen at 43 and 44 which are axially aligned and both of which invade or intersect the chamber 33.

The parting plane 16 of the mold part 12 is formed with mating crucible chamber 46, lower funnel end 47, inclined tap hole 48, and sleeving passages 49 and 50 which are axially aligned and which intersect or invade the chamber 32.

It is noted that the chambers 40 and 46 are formed in upward extensions 52 and 53 of the mold parts 11 and 12, respectively. This reduces the vertical height of the tongue and groove and also the sleeving 35 and 36 for the bar or rod 38.

When the mold parts are clamped together along the major parting plane formed by the surfaces 15 and 16 with the tongue interfitting within the groove, the various chambers mate to form the crucible chamber 56, seen in FIGS. 1 and 2, the funnel bottom 57 thereof, the slanting tap hole 58, and the sleeving passages 59 and 60 for conductor 62.

It can now be seen that the sleeving passages for the conductor are formed in the major parting plane 14, while the sleeving passages for the rod or bar 38 are formed in the offset parting plane formed by the surfaces 18, 19, 20 and 21. Although the sleeving passages for the conductor are shown horizontally, it will be appreciated that the conductor passages may extend at an angle to horizontal.

As shown in FIG. 5, the conductor 66 instead of completely extending through the mold assembly, may terminate at 67 within the weld cavity 69 and accordingly a sleeving passage completely through the mold assembly need not be provided. In FIG. 5, the only sleeving for the conductor is provided at 70. The mold parts 72 and 73 join at the major parting plane 74. The parts include the tongue 75 and the groove 76 which form the offset parting plane 77 in which the sleeving for the rod or bar 38 is formed.

As in the FIG. 1 embodiment, the mold parts form a crucible 80 with an inclined tap hole 81 leading from the lower end of the crucible to the weld chamber 69.

In operation, the mold parts 11 and 12 are clamped together about the vertically extending rod and the conductor offset from the axis of the rod to form the lap connection. A charge of exothermic material is placed within the crucible on a fusible steel disc which closes the top of the tap hole. When the charge of exothermic material is ignited, molten metal is formed which causes the steel disc to melt and the molten metal to run down the tap hole into the weld chamber 34 welding the conductor to the rod. When the weld has cooled sufficiently, the mold parts are opened and cleaned for reuse. Since all of the sleeving and various chambers are exposed to the parting planes, cleaning and assembly is relatively easy.

It can now be seen that the lap welded connection between a conductor and a rod may be accomplished with only two mold parts, greatly simplifying the process and avoiding the necessity of using three or more mold parts to make a similar connection.

Although the invention has been shown and described with respect to certain preferred embodiments, it is obvious that equivalent alterations and modifications will occur to others skilled in the art upon the reading and understanding of this specification. The present invention includes all such equivalent alterations, and modifications, and is limited only by the scope of the claims.

What is claimed is:

1. A mold assembly for lap welding a conductor to a vertical bar or rod comprising two vertically split mold parts, each comprising a major clamping planar surface, each when clamped together forming a crucible chamber, a vertical sleeving passage for said rod or bar, and a tap hole leading from the crucible chamber to a weld chamber, a transverse conductor sleeving passage for the conductor in one or both molds, said weld chamber opening into both such passages, said vertical sleeving passage being formed in a tongue in one of said parts and a mating groove in the other of said parts wherein said vertical passage is offset from the major clamping planar surface.

2. A mold assembly as set forth in claim 1 wherein said offset vertical passage is larger than said transverse passage.

3. A mold assembly as set forth in claim 1 wherein said tongue and groove are formed with draft to seat together when said split mold parts are joined at said major clamping surface.

4. A mold assembly as set forth in claim 1 wherein said crucible chamber is horizontally offset from said vertical sleeving passage.

5. A mold assembly as set forth in claim 4 wherein said tap hole extends inclined from the bottom of the crucible to the weld chamber.

6. A mold assembly as set forth in claim 1 wherein said conductor sleeving passage is formed along said major parting plane.

7. A mold assembly as set forth in claim 6 wherein said weld chamber is formed where the axes of the vertical and conductor passages cross.

8. A two part mold assembly for lap welding a conductor to a vertical bar or rod, each part including sleeving passages for the conductor, and at least one part including an offset sleeving passage, each part also including a crucible chamber and a tap hole passage formed in a major parting surface of said mold parts, said tap hole leading from the crucible to a weld chamber where said sleeving passages adjoin, wherein said offset sleeving passage is for the bar or rod and is formed in a parting surface offset from said major parting surface.

9. A two part mold as set forth in claim 8 wherein said offset parting surface is formed in an interfitting tongue and groove which assists in maintaining proper alignment when said parts are clamped together.

10. A two part mold as set forth in claim 9 wherein said conductor sleeving passages are transverse to said offset sleeving passage.

11. A two part mold as set forth in claim 10 wherein said transverse conductor sleeving passages are formed in the major parting surface of each mold part.

12. A method of lap welding a conductor to a vertical rod or bar comprising the steps of clamping a two part mold assembly about the rod or bar, and in so doing forming a crucible offset from the rod or bar and an inclined tap hole extending from the crucible to a weld chamber adjacent the rod or bar, and about a conductor in conductor sleeving which invades the weld chamber, forming an exothermic charge in said crucible, and igniting such charge to form molten weld metal to enter the weld chamber through said tap hole and weld the conductor to the rod or bar.

13. A method as set forth in claim 12 wherein said mold parts form a sleeving passage for said rod or bar offset from the conductor sleeving passage.

14. A method as set forth in claim 13 including the steps of forming a tongue and groove in said mold parts in which to form said rod or bar sleeving passage.

15. A method as set forth in claim 14 wherein the mold parts have a major parting plane, and said conductor sleeving passage is formed in said major parting plane.

16. A method as set forth in claim 15 wherein said conductor sleeving passage is generally transverse to said rod or bar sleeving passage.

* * * * *